(12) United States Patent
Mishra

(10) Patent No.: US 11,138,752 B2
(45) Date of Patent: Oct. 5, 2021

(54) TRAINING A POSE DETECTION ALGORITHM, AND DERIVING AN OBJECT POSE USING A TRAINED POSE DETECTION ALGORITHM

(71) Applicant: SEIKO EPSON CORPORATION, Tokyo (JP)

(72) Inventor: Akshaya Mishra, Brampton (CA)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/776,675

(22) Filed: Jan. 30, 2020

(65) Prior Publication Data

US 2021/0241476 A1 Aug. 5, 2021

(51) Int. Cl.
*G06T 7/55* (2017.01)
*G06T 17/10* (2006.01)
*G06N 5/02* (2006.01)
*G06T 7/33* (2017.01)

(52) U.S. Cl.
CPC .............. *G06T 7/55* (2017.01); *G06N 5/022* (2013.01); *G06T 7/344* (2017.01); *G06T 17/10* (2013.01); *G06T 2207/10028* (2013.01)

(58) Field of Classification Search
CPC ....................................................... G06T 7/55
USPC ........................................................ 345/419
See application file for complete search history.

(56) References Cited

U.S. PATENT DOCUMENTS

| 2004/0019598 | A1* | 1/2004 | Huang | G16H 50/70 |
| 2018/0222058 | A1 | 8/2018 | Mizobe et al. | |
| 2019/0197196 | A1* | 6/2019 | Yang | G06T 17/05 |
| 2020/0234466 | A1* | 7/2020 | Holzer | G06N 3/08 |

OTHER PUBLICATIONS

Tan et al.; "Multi-Forest Tracker: A Chameleon in Tracking;" 2014 IEEE Conference on Computer Vision and Pattern Recognition (CVPR); pp. 1202-1209; 2014.
Tan et al.; "Looking Beyond the Simple Scenarios: Combining Learners and Optimizers in 3D Temporal Tracking;" IEEE Transactions on Visualization and Computer Graphics; vol. 23; No. 11; pp. 2399-2409; Nov. 2017.
Tan et al.; "A Versatile Learning-based 3D Temporal Tracker: Scalable, Robust, Online;" International Conference on Computer Vision (ICCV); Santiago, Chile; pp. 693-701; Dec. 2015.

(Continued)

*Primary Examiner* — Shivang I Patel
(74) *Attorney, Agent, or Firm* — Oliff PLC

(57) ABSTRACT

Training a pose detection algorithm and deriving an object pose using a trained pose detection algorithm. Specifying a first view of a 3D model with respect to a virtual camera, generating a depth map by projecting the 3D model based on the first view, generating a second view by perturbing the first view, selecting reference 2D locations in an overlapping area of the 3D model between the first view and the second view. Transforming the reference 2D locations into a 3D point set corresponding to the second view. For each reference 2D location, calculating a depth difference between the first view and the second view at the reference 2D location. Associating the perturbation between the second view and the first view with the calculated depth differences, and training an algorithm model to identify a pose of an object corresponding to the 3D model.

19 Claims, 15 Drawing Sheets

(56) References Cited

OTHER PUBLICATIONS

Rusu et al.; "Fast Point Feature Histograms (FPFH) for 3D Registration;" Robotics and Automation, 2009; ICRA '09 International Conference on IEEE; 2009.

Johnson et al.; "Using Spin Images for Efficient Object Recognition in Cluttered 3D Scenes;" IEEE Transactions on Pattern Analysis and Machine Intelligence; vol. 21; No. 5; pp. 433-449; May 1999.

Tombari et al.; "Unique Signatures of Histograms for Local Surface Description;" European Conference on Computer Vision; Springer; Berlin, Heidelberg; pp. 356-369; 2010.

Tan et al.; "6D Object Pose Estimation with Depth Images: A Seamless Approach for Robotic Interaction and Augmented Reality;" Technische Universität München; pp. 1-4; Sep. 5, 2017.

Brachmann et al; "Learning 6D Object Pose Estimation using 3D Object Coordinates;" pp. 1-16.

* cited by examiner

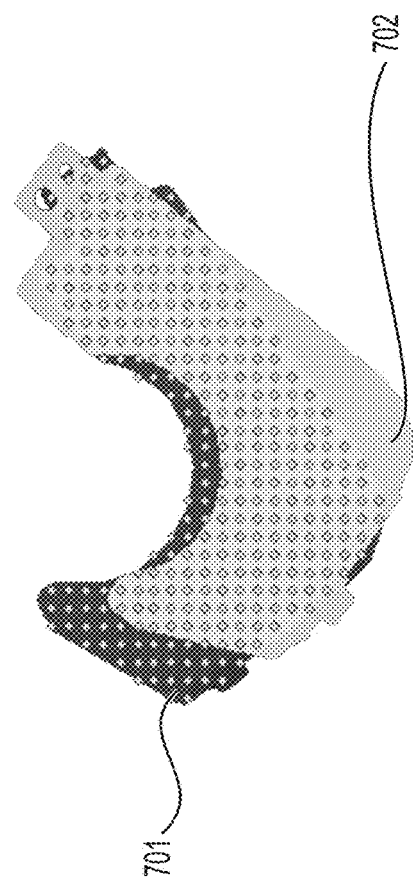
FIG. 7A
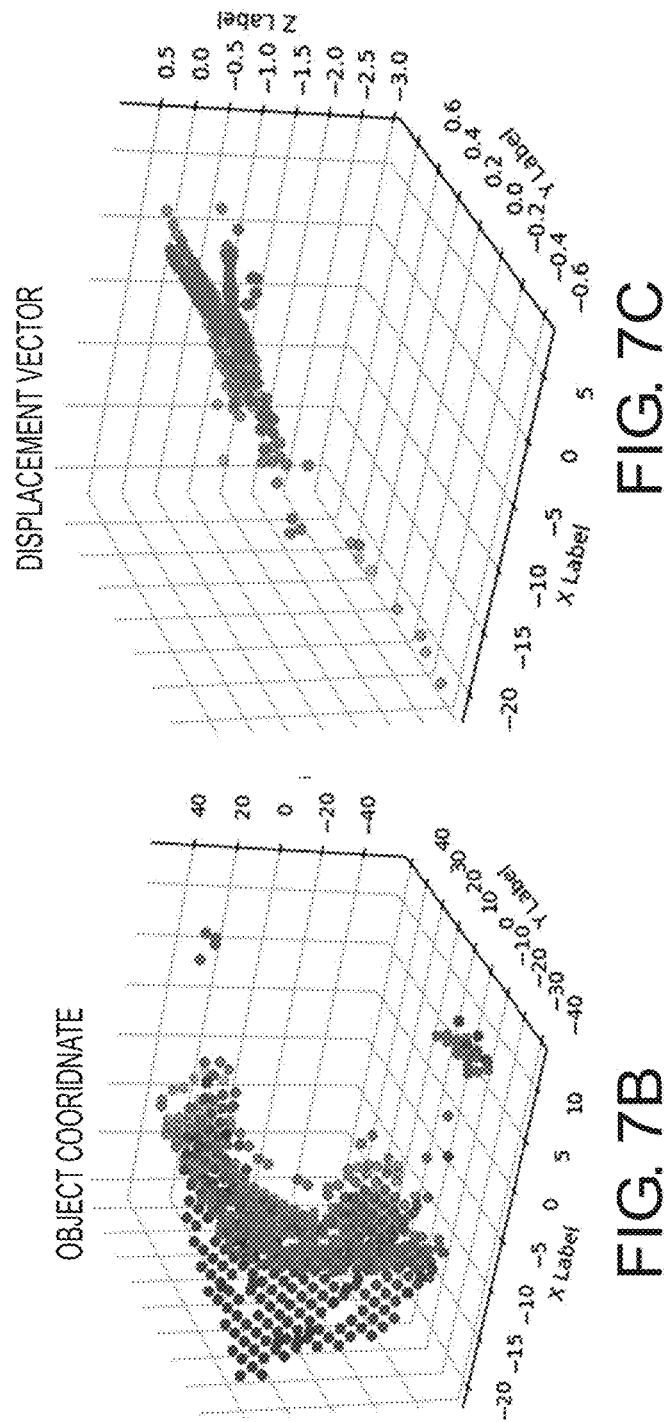
FIG. 7B
FIG. 7C

TRAINING A POSE DETECTION ALGORITHM, AND DERIVING AN OBJECT POSE USING A TRAINED POSE DETECTION ALGORITHM

BACKGROUND

Technical Field

The instant disclosure relates to training object detection algorithms. More particularly, the disclosure relates to a non-transitory computer readable medium having instructions to cause one or more processors to perform a method to auto-train an ensemble of decision trees for pose refinement, and to refine object pose using an ensemble of trained decision trees. The disclosure also relates to a pyramid of ensemble of trees that may be used for pose estimation.

Related Art

Automatic bin picking is a process of locating objects of interest from a plurality of randomly stored objects in a bin. An apparatus, such as a robot, may be controlled by a computer in a manner whereby the six degrees of freedom (forward/back, up/down, left/right, yaw, pitch, roll) of at least one pickable object are identified at some time. The robot's end effector may then be moved toward the object and grasp the object. Such a system of automatic grasping and handling of an object may be used in industry for many industrial automations.

Complications in achieving grasping or otherwise performing an intended action on an object may occur in situations where an object's pose, or a combination of a position and orientation of an object, is not well known beforehand. Object Detection and Pose Estimation (ODPE) techniques have been developed to improve computer vision, improving the ability, for example, for robots to more appropriately achieve their goals in bin picking and otherwise.

SUMMARY

ODPE techniques involve using geometrical template matching using local invariant features or point pair features. However, a problem arises in some situations where objects that are randomly stored may often overlap each other. The techniques thus result in significant missing data and background clutter. Systems using such techniques often fail to appropriately estimate the object pose or otherwise may take a significant amount of time.

An advantage of some aspects of the instant disclosure is to solve at least part of the problems described above, and aspects of the disclosure can be implemented as the following aspects.

One aspect of the disclosure is a non-transitory computer readable medium that embodies instructions that cause one or more processors to perform a method for training an object detection algorithm. The method includes (a) specifying a first view of a 3D model with respect to a virtual camera; (b) generating a depth map by projecting the 3D model based on the first view; (c) generating a second view around the first view by perturbing the first view; (d) selecting reference 2D locations from the first depth map, the reference 2D locations being in an overlapping area of the 3D model between the first view and the second view; (e) transforming the reference 2D locations into a 3D-point set corresponding to the second view; (f) for each reference 2D location, calculating a depth difference between the first view and the second view at the reference 2D location using (i) the 3D-point set and (ii) the depth map; (g) associating the perturbation between the second view and the first view with the calculated depth differences; and (h) training an algorithm model to identify a pose of an object corresponding to the 3D model based on the association of the perturbation.

A further aspect of this disclosure is a non-transitory computer readable medium that embodies instructions that cause one or more processors to perform a method for deriving a pose of an object. The method includes (a) generating a depth map based on sensor data acquired by a depth sensor sensing an object; (b) deriving a first pose of the object corresponding to the depth map; (c) acquiring 3D feature points based on a 3D model corresponding to the object; (d) acquiring two-dimensional (2D) feature points by projecting the 3D feature points onto a virtual plane using the first pose; (e) acquiring depth values associated with 2D locations of the depth map, the locations being at the same locations as the 2D feature points on the virtual plane; and (f) deriving a second pose of the object by applying a trained algorithm model to a difference between (i) Z coordinate values of the 3D feature points and (ii) the respective depth values).

The skilled person will appreciate that except where mutually exclusive, a feature described in relation to any one of the above embodiments may be applied mutatis mutandis to any other embodiment.

BRIEF DESCRIPTION OF THE DRAWINGS

FIGS. 7A-7C collectively show a diagram for generation of training data according to the disclosure.

DETAILED DESCRIPTION OF EMBODIMENTS

The disclosure relates generally to pose estimation including training object detection algorithms and refining object poses by applying training object detection algorithms. The training may utilize an ensemble of decision trees, and the refining may use an ensemble of trained decision trees.

Configuration of Robot

Figure 1:
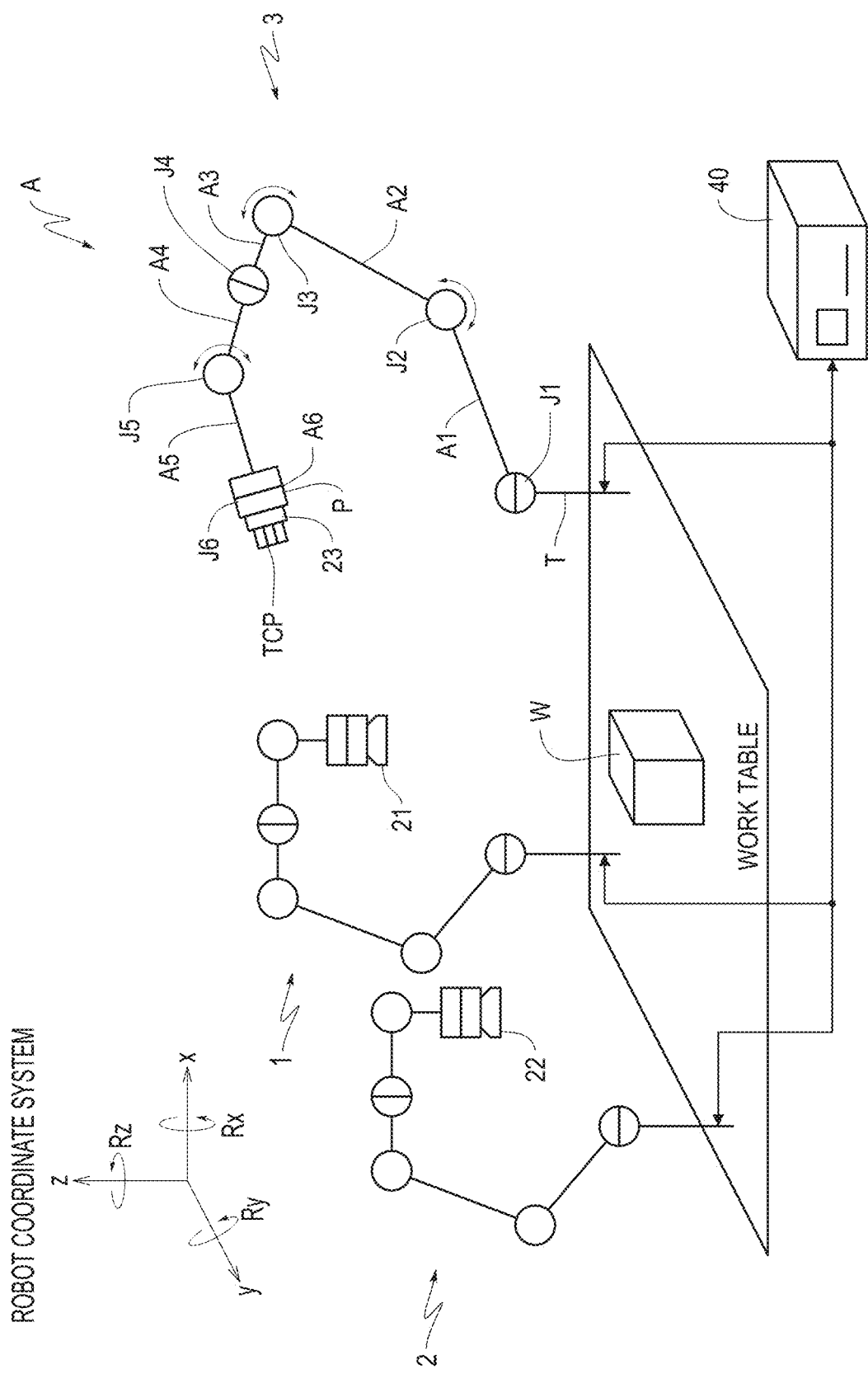
FIG. 1 is a perspective view of a robot system upon which aspects of the disclosure are embodied.

FIG. 1 is a perspective view illustrating a robot controlled by a control device according to an aspect of this disclosure. A robot system in one aspect includes robots 1 to 3 as illustrated in FIG. 1. Each of the robots 1 to 3 is a six-axis robot including an end effector, and the different end effectors are attached to the robots 1 to 3. In other words, the robot 1 is attached with an imaging unit 21 (for example, an RGB stereo- or monocular-camera and a depth sensor, or an RGB-D sensor), the robot 2 is attached with an illumination unit 22 like an illuminator, and the robot 3 is attached with a gripper 23. Herein, the imaging unit 21 and the illumination unit 22 are referred to as an optical system.

The robots 1 to 3 are controlled by a control device 40. The control device 40 is communicably connected to the robots 1 to 3 via cables. A constituent element of the control device 40 may be provided in the robot 1. The control device 40 may be formed of a plurality of devices (for example, a learning unit and a control unit are provided in different devices), or may be formed of a single device. The control device 40 can be communicably connected to a teaching device (not illustrated) via a cable or wireless communication. The teaching device may be a dedicated computer, and may be a general purpose computer in which a program for teaching the robot 1 is installed. The control device 40 and the teaching device may be integrally formed with each other.

The robots 1 to 3 are single-arm robots of which various end effectors are attached to arms, and, in this aspect, configurations of the arms or axes of the robots 1 to 3 are equivalent to each other. In FIG. 1, reference signs for explaining arms or axes are added to the robot 3. As illustrated in the robot 3, each of the robots 1 to 3 includes a base T, six arm members A1 to A6, and six joints J1 to J6. The base T is fixed to a work table. The base T and the six arm members A1 to A6 are connected to each other via the joints J1 to J6. The arm members A1 to A6 and the end effectors are movable portions, and the movable portions are operated such that the robots 1 to 3 can perform various pieces of work.

In this aspect, the joints J2, J3 and J5 are bent joints, and the joints J1, J4 and J6 are torsional joints. The arm member A6 on the distal end side in the arm A is attached with a force sensor P and the end effector. Each of the robots 1 to 3 drives the arms of six axes such that the end effector is disposed at any position within a movable range, and can thus take any pose.

The end effector provided in the robot 3 is the gripper 23, and can grip a target object W. The end effector provided in the robot 2 is the illumination unit 22, and can illuminate an irradiation region with light. The end effector provided in the robot 1 is the imaging unit 21, and can capture an image within a visual field. In this aspect, a position which is relatively fixed with respect to the end effector of each of the robots 1 to 3 is defined as a tool center point (TCP). A position of the TCP is a reference position of the end effector, and a TCP coordinate system which has the TCP as the origin and is a three-dimensional orthogonal coordinate system relatively fixed with respect to the end effector is defined.

The force sensor P is a six-axis force detector. The force sensor P detects magnitudes of forces which are parallel to three detection axes orthogonal to each other, and magnitudes of torques about the three detection axes, in a sensor coordinate system which is a three-dimensional orthogonal coordinate system having a point on the force sensor as the origin. In this aspect, the six-axis robot is exemplified, but various aspects of robots may be used, and aspects of the robots 1 to 3 may be different from each other. Any one or more of the joints J1 to J5 other than the joint J6 may be provided with a force sensor as a force detector.

If a coordinate system for defining a space where the robots 1 to 3 are provided is referred to as a robot coordinate system, the robot coordinate system is a three-dimensional orthogonal coordinate system defined by an x axis and a y axis orthogonal to each other on a horizontal plane, and a z axis having a vertical upward as a positive direction (refer to FIG. 1). A negative direction of the z axis substantially matches the gravitational direction. A rotation angle about the x axis is indicated by Rx, a rotation angle about the y axis is indicated by Ry, and a rotation angle about the z axis is indicated by Rz. Any position in the three-dimensional space can be expressed by positions in the x, y and z directions, and any pose in the three-dimensional space can be expressed by rotation angles in the Rx, Ry and Rz directions. Hereinafter, the term pose indicates a position of an object, such as the target object W, in the x, y, z directions and an attitude of the object with respect to angles expressed in the Rx, Ry, and Rz directions.

In this aspect, relationships among various coordinate systems are defined in advance, and coordinate values in the various coordinate systems can be converted into each other.

Figure 2:
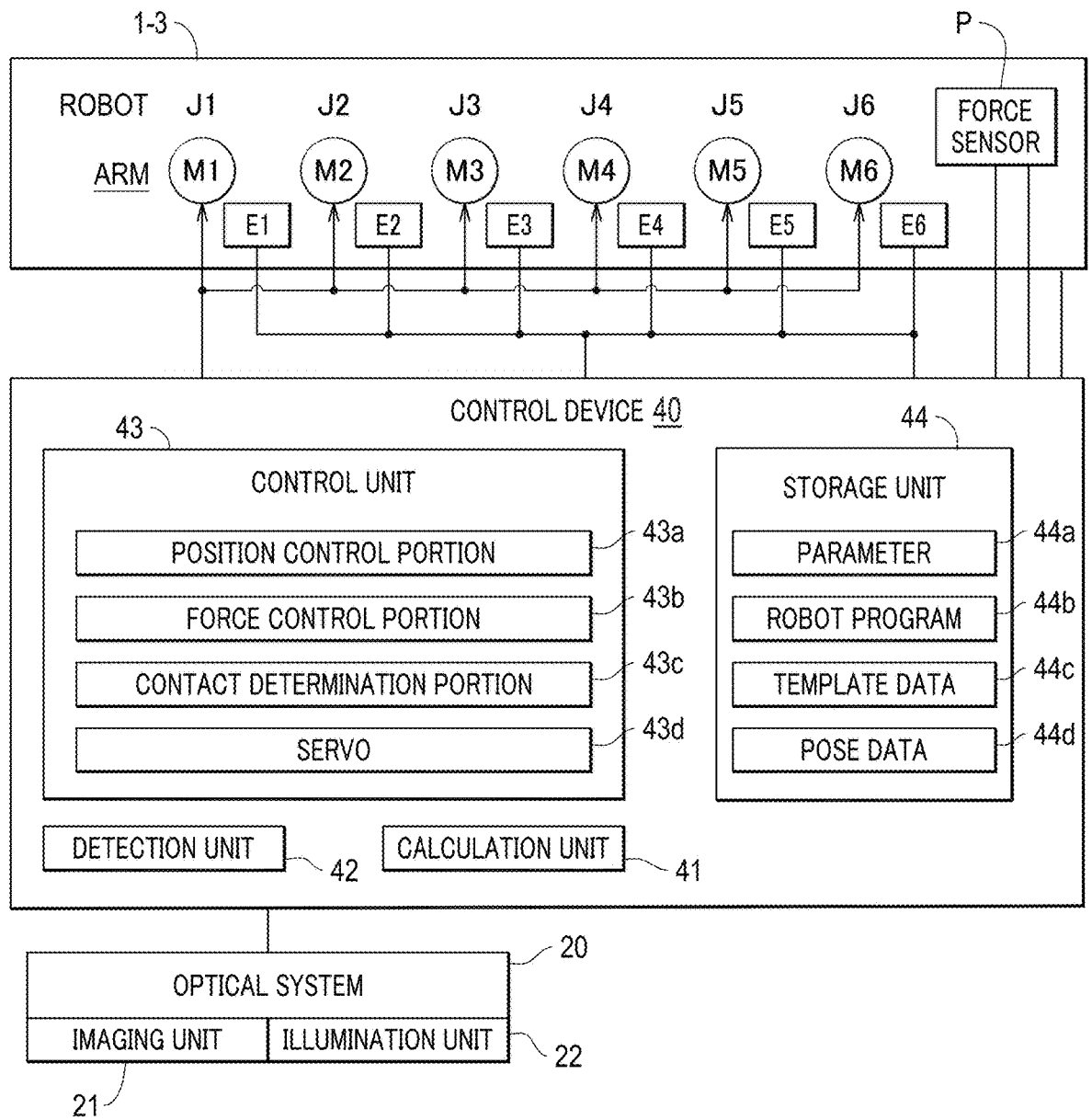
FIG. 2 is a functional block diagram of a control system according to the disclosure.

As shown in FIG. 2, a robot, for example the robot 1, is a general purpose robot which can perform various pieces of work through teaching, and includes, motors M1 to M6 as actuators, and encoders E1 to E6 as sensors. Controlling the arms indicates controlling the motors M1 to M6. The motors M1 to M6 and the encoders E1 to E6 are provided to respectively correspond to the joints J1 to J6, and the encoders E1 to E6 respectively detect rotation angles of the motors M1 to M6. The respective motors M1 to M6 are connected to power lines for supplying power, and each of the power lines is provided with an ammeter. Therefore, the control device 40 can measure a current supplied to each of the motors M1 to M6.

The control device 40 includes hardware resources such as a computer and various software resources stored in a storage unit 44, and can execute a program. In the present embodiment, the control device 40 functions as a calculation unit 41, a detection unit 42, and a control unit 43. The hardware resources may include a processor such as a CPU, a memory such as a RAM, a ROM, and the like, and may include an ASIC, and various configurations may be employed. The storage unit 44 is a computer readable medium such as a flash memory, a solid-state memory, or a magnetic memory. The control device may work interactively with an operation unit such as a user interface or GUI for receiving an operation from a user. The operation unit may include a keyboard, mouse and touch pad and the like and their driver software.

In the present embodiment, the detection unit 42 performs a process of detecting a target object W, and the control unit 43 drives the arms of the robots 1 to 3. The detection unit 42 is connected to the imaging unit 21 and the illumination unit 22 forming an optical system 20. The detection unit 42 controls the imaging unit 21, and acquires an image captured by an imaging sensor, such as an RGB-D sensor, provided in the imaging unit 21. The detection unit 42 controls the illumination unit 22, and changes brightness of output light.

If an image is output from the imaging unit 21, the detection unit 42 performs a template matching process on the basis of the captured image, and performs a process of detecting a relatively coarse position (pose) of a target object W. In other words, the detection unit 42 performs the template matching process on the basis of the template data 44*c*. Template data 44*c* is a template for each of a plurality of poses stored in the storage unit 44. Therefore, if a pose is correlated with an ID or the like with respect to the template data 44*c*, a pose of a target object W viewed from the detection unit 42 can be specified by using the appropriate type of template data 44*c*, as will be described in further detail below.

A position at which the illumination unit 22 is disposed when a target object W is imaged is defined as a position of the illumination unit, and is included in the illumination unit parameter. The illumination unit 22 includes a mechanism capable of adjusting brightness, and a value of brightness of when a target object W is imaged is included in the illumination unit parameter. A position of the illumination unit may also be described in various methods, and, for example, a configuration in which a position of the TCP of the illumination unit 22 is described in the robot coordinate system may be employed.

As described above, the detection unit 42 may operate the robot 1 or 2 by specifying a position of the imaging unit 21 or the illumination unit 22 on the basis of the optical parameters, but positions of when the robot 1 and the robot 2 are driven may be given by the operation parameters or the force control parameters.

In one aspect, the control unit 43 includes the position control portion 43*a*, a force control portion 43*b*, a contact determination portion 43*c*, and a servo 43*d*. In the control unit 43, a correspondence relationship U1 between a combination of rotation angles of the motors M1 to M6 and a position of the TCP in the robot coordinate system is stored in a storage medium, and a correspondence relationship U2 between the coordinate systems is stored in a storage medium. Therefore, the control unit 43 or the calculation unit 41 can convert a vector in any coordinate system into a vector in another coordinate system on the basis of the correspondence relationship U2. For example, the control unit 43 or the calculation unit 41 may acquire acting forces to the robots 1 to 3 in the sensor coordinate system on the basis of outputs from the force sensor P, and may convert the acting forces into forces acting on positions of the TCP in the robot coordinate system. The control unit 43 or the calculation unit 41 may convert a target force expressed in the force control coordinate system into a target force at a position of the TCP in the robot coordinate system. Of course, the correspondence relationships U1 and U2 may be stored in the storage unit 44.

The storage unit 44 stores a robot program 44*b* for controlling the robots 1 to 3 in addition to the parameters 44*a*. In the present embodiment, the parameters 44*a* and the robot program 44*b* are generated through teaching and are stored in the storage unit 44, but may be corrected by the calculation unit 41. The robot program 44*b* mainly indicates the sequence of work (an order of steps) performed by the robots 1 to 3, and is described by a combination of pre-defined commands. The parameters 44*a* are specific values which are required to realize each step, and are described as arguments of each command. The storage unit 44 also stores pose data 44*d* for determining a pose of the object W, as will be described below in further detail.

The parameters 44*a* for controlling the robots 1 to 3 include the operation parameters and the force control parameters in addition to the optical parameters. The operation parameters are parameters related to operations of the robots 1 to 3, and are parameters which are referred to during position control in the present embodiment. In other words, in the present embodiment, a series of work may be divided into a plurality of steps, and the parameters 44*a* of when each step is performed are generated through teaching. The operation parameters include parameters indicating a start point and an end point in the plurality of steps. The start point and the end point may be defined in various coordinate systems, and, in the present embodiment, the start point and the end point of the TCP of a control target robot are defined in the robot coordinate system. In other words, a translation position and a rotation position are defined for each axis of the robot coordinate system.

The configuration of the robot and robot system is also described in U.S. patent application Publication Ser. No. 15/888,552, filed Feb. 5, 2018, the entire contents of which, along with priority application Japanese Patent Application No. 2017-019312, filed Feb. 6, 2017 are hereby incorporated by reference in their entireties. The aspects of the disclosure discussed herein may be implemented with the robot and robot system described in U.S. patent application Publication Ser. No. 15/888,552 and Japanese Patent Application No. 2017-019312.

Training for Pose Estimation

Figure 3:
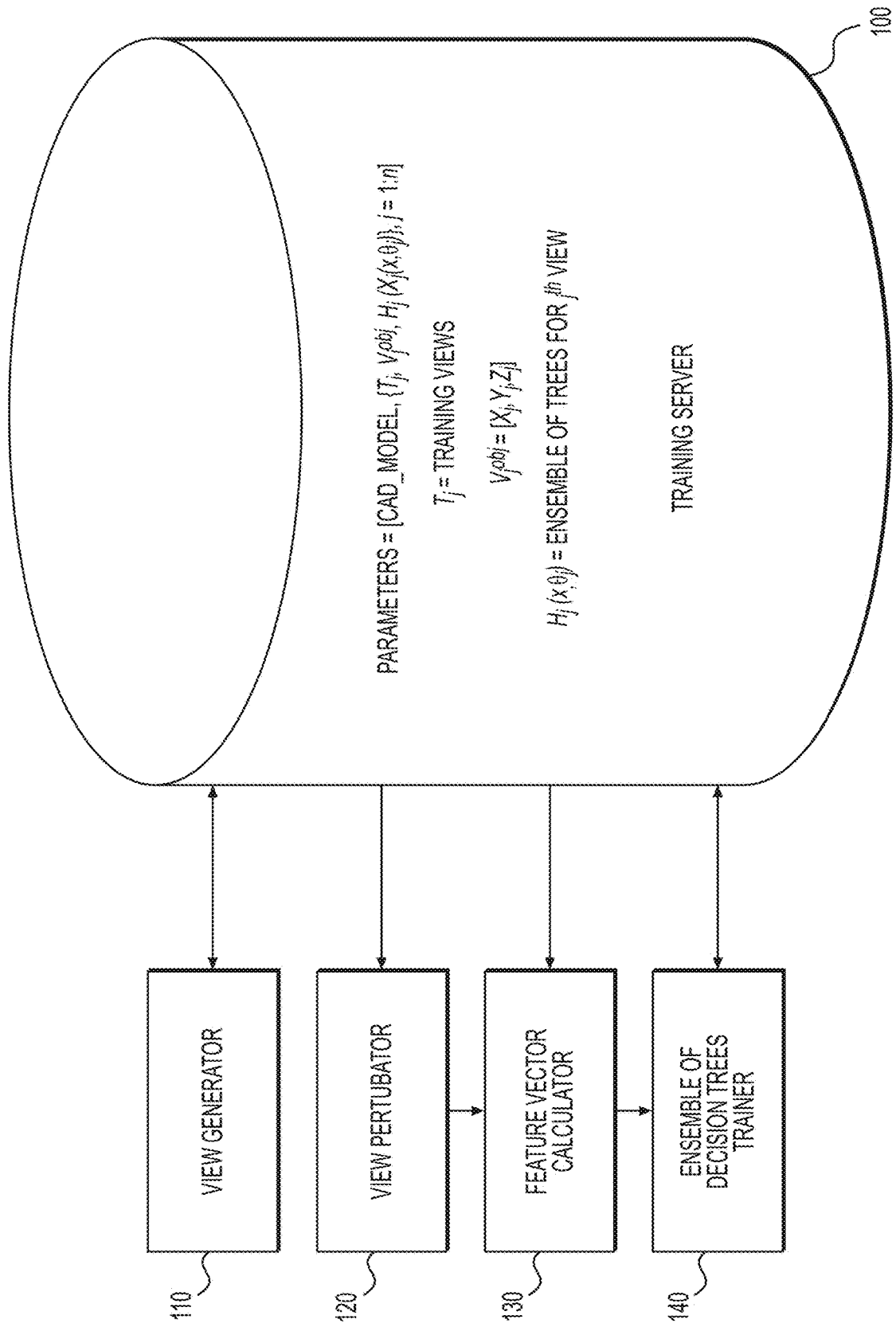
FIG. 3 is a diagram of the architecture of an auto-trainer according to the disclosure.

FIG. 3 is a diagram of the architecture of an auto-trainer according to some aspects, and particularly to an interaction of systems directed to a process of performing training for pose estimation. The process may be performed by the control device 40 of FIG. 2, and embodied within the robot, e.g., robot 1 or robots 1-3 of FIG. 1.

FIG. 3 refers to a computer-aided design (CAD) model based multi-class (Multi-view) training technique that may be performed offline. The model may allow for object detection and pose estimations. During the learning phase, for each pose or view, the algorithm may learn a mapping function between an input feature vector ($f_i$) and output pose metric ($p_i$) using a set of training examples, $t_i=\{i=1:n\}$.

FIG. 3 identifies four systems as part of an auto-trainer. The systems interact with a training server 100. The training server 100 is configured to interact with a view generator 110, a view perturbator 120, feature vector calculator 130 and ensemble of decision trees trainer 140. The system together forms an auto trainer and may be controlled by the control device 40 of FIG. 1.

The view generator 110 is provided to generate an optimal number of views. The optimal number of views may advantageously reduce a runtime of the autotraining process as compared to known methods of training for pose estimation, and may also achieve a desired accuracy. Each view generated by the view generator 110 can represent a particular visible portion of a target object imaged from a particular camera pose. The target object may be an object to which the robot 1 of FIG. 1 is instructed to perform an action, such as gripping using the gripper 23 of FIG. 1 during a bin picking process or otherwise.

The view perturbator 120 may be configured to, once given an object, a view and a learning function, automatically determine the extent to which a provided learning function can predict the pose of the target object. Such an extent is further described herein as a neighboring pose or neighboring area of a reference pose or a reference view.

The feature vector calculator 130 may be used for training data generation and feature extraction. The feature extraction may occur, given an optimal number of views and neighboring poses, by automatically generating feature vectors $f_i$ and their corresponding labels $l_i$ to learn an ensemble of predictors. In this case, $i=1:n_s$ is the $i^{th}$ training sample and $n_s$ is total number of training samples.

The ensemble of decision trees trainer 140 may train an ensemble of decision trees using the feature sets and labels derived by the feature vector calculator 130.

Figure 4:
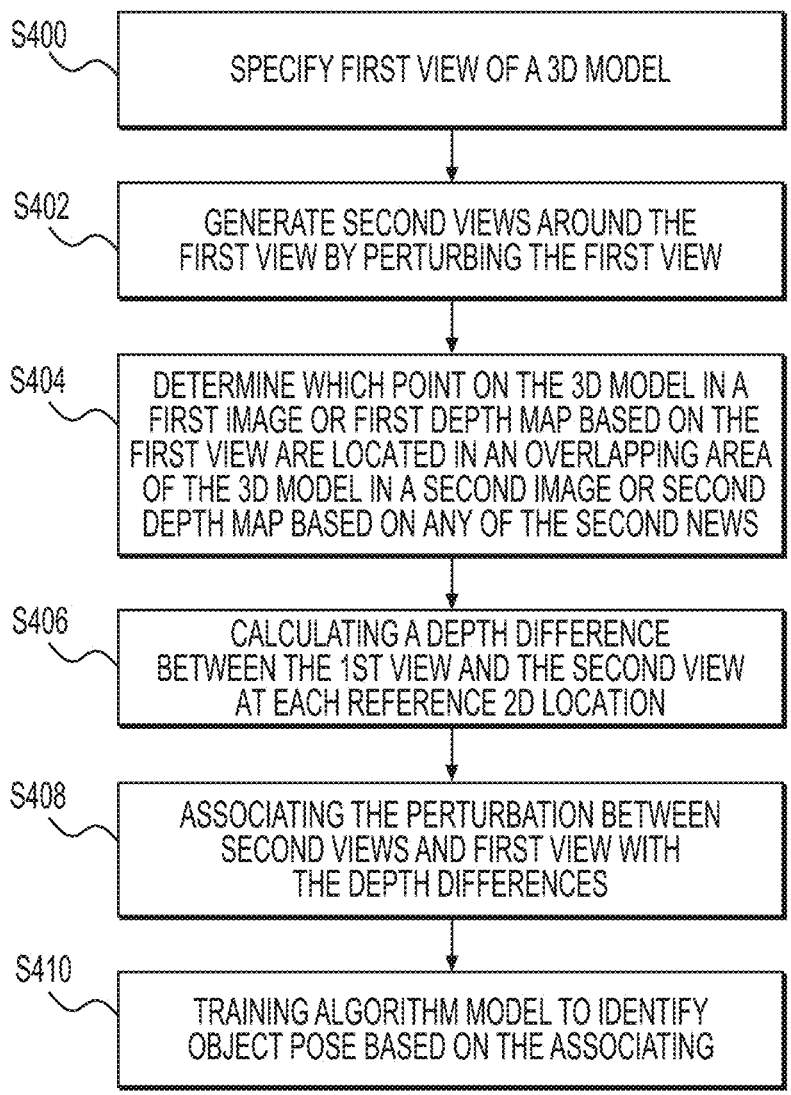
FIG. 4 is a flow diagram of an example method according to the disclosure.

Further specifics of operations of the view generator 110, the view perturbator 120, the feature vector calculator 130 and the ensemble of decision trees trainer 140 may be found with reference to FIG. 4.

FIG. 4 shows a flow diagram of processes that may be controlled by the control device 40 of FIG. 2, or by any non-transitory computer readable medium having instructions to cause processors to perform such a method according to this aspect. In step S400, a first view of a 3D model may be specified. The specifying may be done with respect to a virtual camera for rendering the 3D model on an image. Step S400 may be performed by the view generator 110 of FIG. 3, controlled by the control device 40 of FIG. 2, but its performance may be performed by any subcomponent of systems disclosed herein.

The first view may be a training view and may be any view of the virtual camera. While the process may begin with acquiring such a view, the process discussed herein may reduce learning function complexity given that instead of just using a single view to train a complex learning function, multiple simple learning functions, where each learning function is responsible for a corresponding object pose, can be used. Accordingly, as further discussed herein, an optimal number of reference views or training views can be generated from the camera view and initial learning function using a perturbation process. One skilled in the art would recognize a perturbation process as one whereby the initial learning function or some initial view taken by the camera is deviated from its normal state by a shift or the like. Owing to this process, an optimal number of reference views or training views $T_j, j=1: n_v$, where $T_j$ is the $j^{th}$ training view and $n_v$ is total number of training views, can be acquired.

Advantageously, the complexity of the learning function can thereby be reduced and visibility context can be explored robustly and efficiently.

In step S402, a plurality of second views can be generated around the first view. This process may be further detailed as below.

The initial camera view (first view) may be defined as $T_j=0$, and a learning function may be defined as $H(x,\theta_j=0)$. Step S402 may include perturbing the camera view $T_0$ within a particular range. An exemplary range may be from (1 mm, 1°) to (20 mm, 20°). In some aspects, a desirable perturbation amount may be within a range of (10 mm, 10°).

Upon the perturbing of the camera view, a plurality of perturbed views, or second views, $T_{jper_i}$, may be generated. The number of perturbed views to be generated is not limited, but may be about 2000 to about 5000, or about 2500.

In some aspects, step S402 may further include splitting the perturbed views into a plurality of training views and a plurality of validation views. The number of training views and number of validation views is not limited, but in some aspects, there may be 1000-2500, or about 1800 training views, and 500-1000, or about 700 validation views.

In some aspects, within step S402, a validation process may occur. The learning algorithm may be tested using the validation views and an accuracy of the validation views may be compared to a validation error tolerance using a predetermined formula and/or using validation error computation.

An exemplary threshold for a validation error is 2-7%, or 5%. If the validation error is greater than the validation error threshold, then S402 may be repeated by increasing a perturbation range by a predetermined percentage (such as 5%). If the validation accuracy is within the validation error threshold, the system may mark all perturbed views as visited pose and label them as the neighboring pose (or poses) of $T_1$.

After the neighboring poses are labeled, another pose $T_{j+1}$ may be chosen, the pose $T_{jil}$ being a pose that is not within the perturbation range (e.g., not within the range of (10 mm, 10°) or any other range used as the perturbation range) from any visited pose. Step 402 may then be repeated for each $n_v$ training view.

Referring back to FIG. 4, Step S404 includes determining which points on the 3D model in a first image or a first depth map based on the first view are located in an overlapping area of the 3D model in a second image or second depth map based on any one of the second views. The overlapping area is defined from the viewpoint of the rendering camera. Such a step may be performed within the view generator 110 or the view perturbator 120, or both. In some aspects, only the points in the overlapping area are used to for calculations of their depth differences and association to the perturbation.

Once acquiring a particular training view $T_j$ and its neighboring view, the view perturbator 120 is configured to generate a plurality of training samples for the purpose of pose refinement. The view perturbation may be achieved by splitting the training views $T_j$ into 6 degrees of freedom ($\alpha$, $\beta$, $\gamma$, $t_x$, $t_y$, $t_z$).

Then, six random numbers, [$\delta\alpha$, $\delta\beta$, $\delta\gamma$, $\delta t_x$, $\delta t_y$, $\delta t_z$] may be generated. The view perturbator may ensure that the random numbers all lie within a neighborhood of $T_j$, such as within a predetermined area around $T_j$. The training sample may be derived by the following formula:

$$\delta T_j = \text{EulerToRot}([\delta\alpha, \delta\beta, \delta\gamma, \delta t_x, \delta t_y, \delta t_z]); T_{jper_i=j} \times \delta_j.$$

Figure 5:
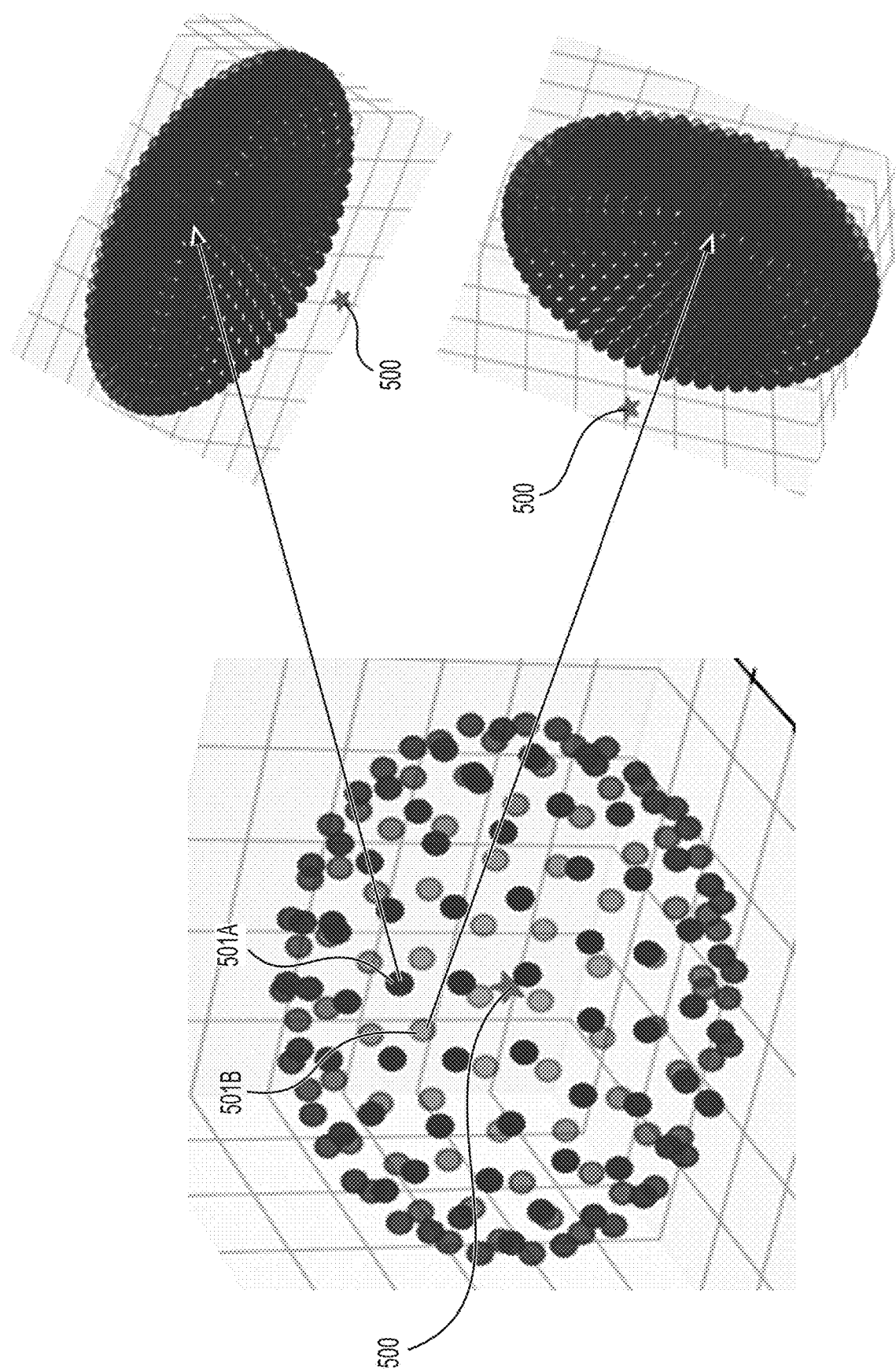
FIG. 5 is a diagram for generation of a training view according to the disclosure.

FIG. 5 shows steps for training view generation and a 360-degree view sphere and neighboring poses. This is a general diagram of how a training view is generated. FIG. 5 shows an object or a 3D model corresponding to the object, denoted by star 500, and a plurality of views including 501A and 501B as shown in a 360-degree view sphere.

The arrow extending from point 501A to the Figure inserted in the top-right of FIG. 5 shows the perspective of the object from point 501A. The top-right Figure also shows a plurality of perturbed views (second views) as taken from the point 501A. The system will assess at least some, and possibly all, of these perturbed views and determine a training algorithm using the assessment of each of these perturbed views as further described herein.

The point 501B similarly has an arrow directing to the bottom-right Figure, which shows a plurality of perturbed views (second) views as taken from the point 501B. Similarly, the system will assess at least some, and possibly all, of these perturbed views and determine a training algorithm using the assessment of each of these perturbed views as further described herein.

FIG. 5 shows two views being perturbed, though the number of views being perturbed is not so limited. For example, only one view may be perturbed, or a large plurality of views may be perturbed, with the system ultimately associating the perturbed (second) views and any depth differences therebetween.

Step S406 includes calculating a depth difference between the first view and the second view at each reference 2D location described later.

Step S408 includes associating the perturbation between each of the second views and the first view with the respective calculated depth differences.

Figure 6A:
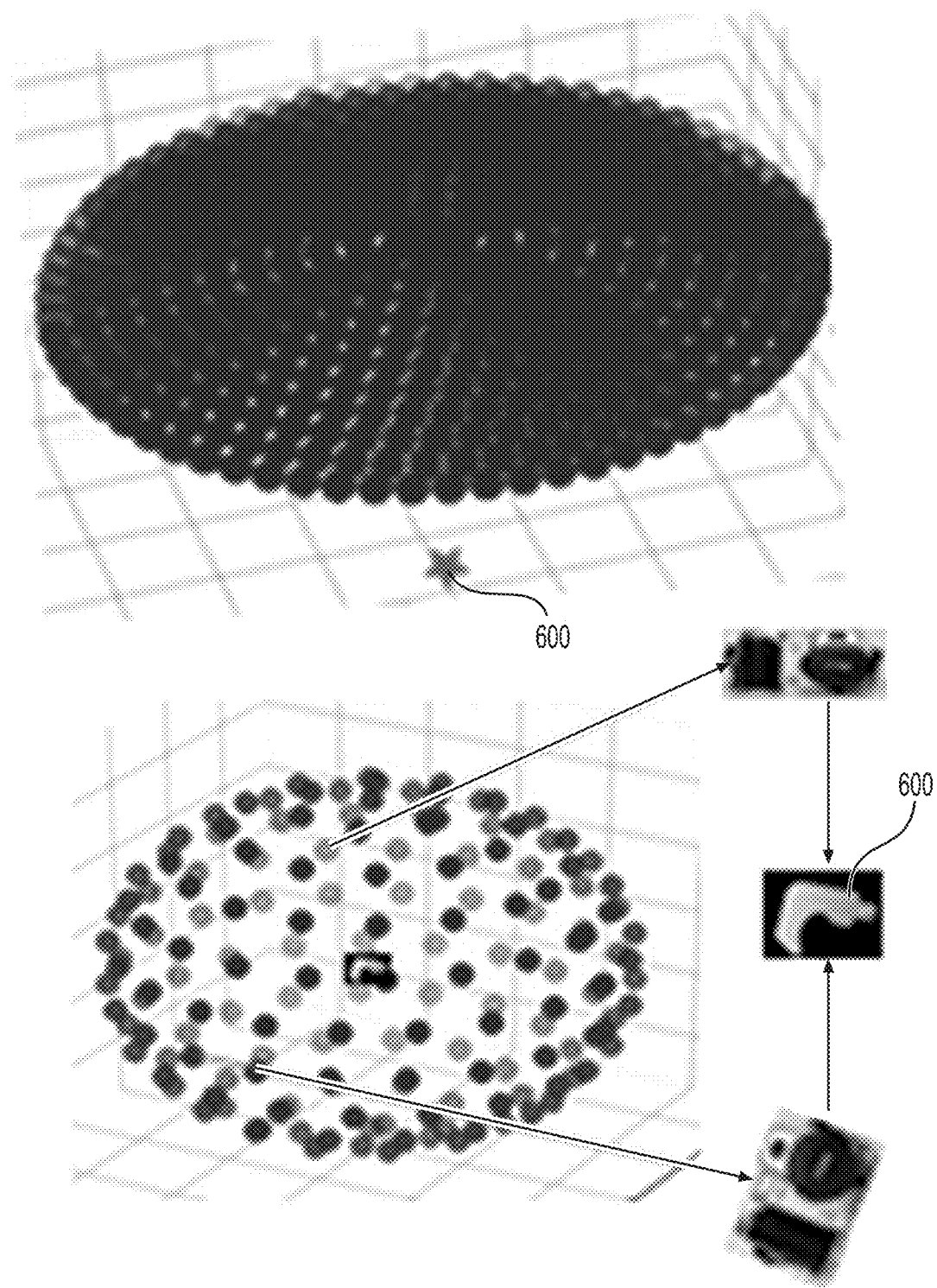
FIGS. 6A-6F collectively show an overview of auto-training according to the disclosure.

Referring to FIG. 6A, a rendering of reference and perturbed poses is shown. The object 600 is shown at the center of the view sphere. N-reference views of the object are generated (each point on the sphere would correspond to a different reference view). Each reference view is perturbed p times. The cone on the top graph of FIG. 6A represents a perturbed neighboring area (including perturbed views) of a reference view. The object (the same object as in the bottom figure of FIG. 6A) is shown at 600.

Figure 6B:
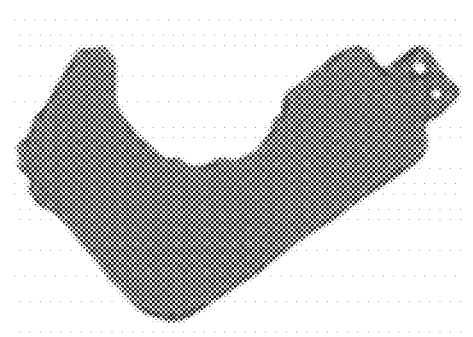
Figure 6D:
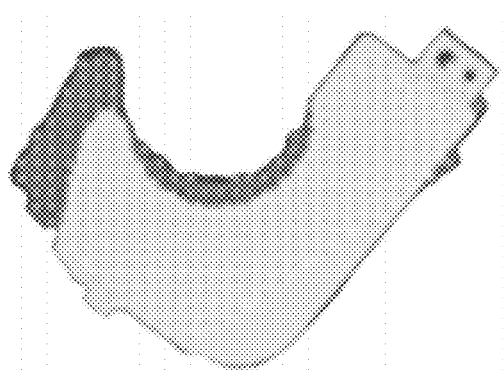
Figure 6C:
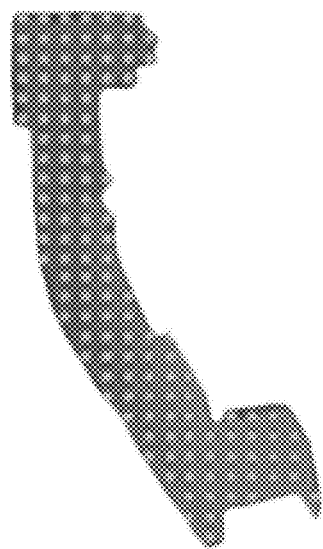
Figure 6E:
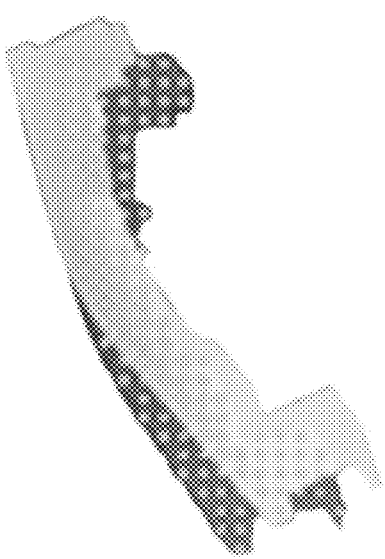

Referring to FIGS. 6B-6E, particular renderings of reference and perturbed poses for points, which may be in an overlapping area of the 3D model at the reference and perturbed poses, as selected in FIG. 6A are shown. The top point from FIG. 6A identified with the top arrow on FIG. 6A, corresponds to a pose, with FIG. 6B showing the reference pose at that location. The lower point from FIG. 6A identified with the lower arrow corresponds to another pose, with FIG. 6C showing the reference pose at that location. FIG. 6D shows the same reference pose of FIG. 6B along with the perturbed pose or perturbed view generated therefrom. Similarly, FIG. 6E shows the same reference pose of FIG. 6C along with the perturbed pose or perturbed view generated therefrom.

For each camera pose, a set of perturbed poses (or views) $Tj_{per_i}$ are generated.

The training data generation may further occur as described herein, with reference to feature vector calculator 130.

Figure 6F:
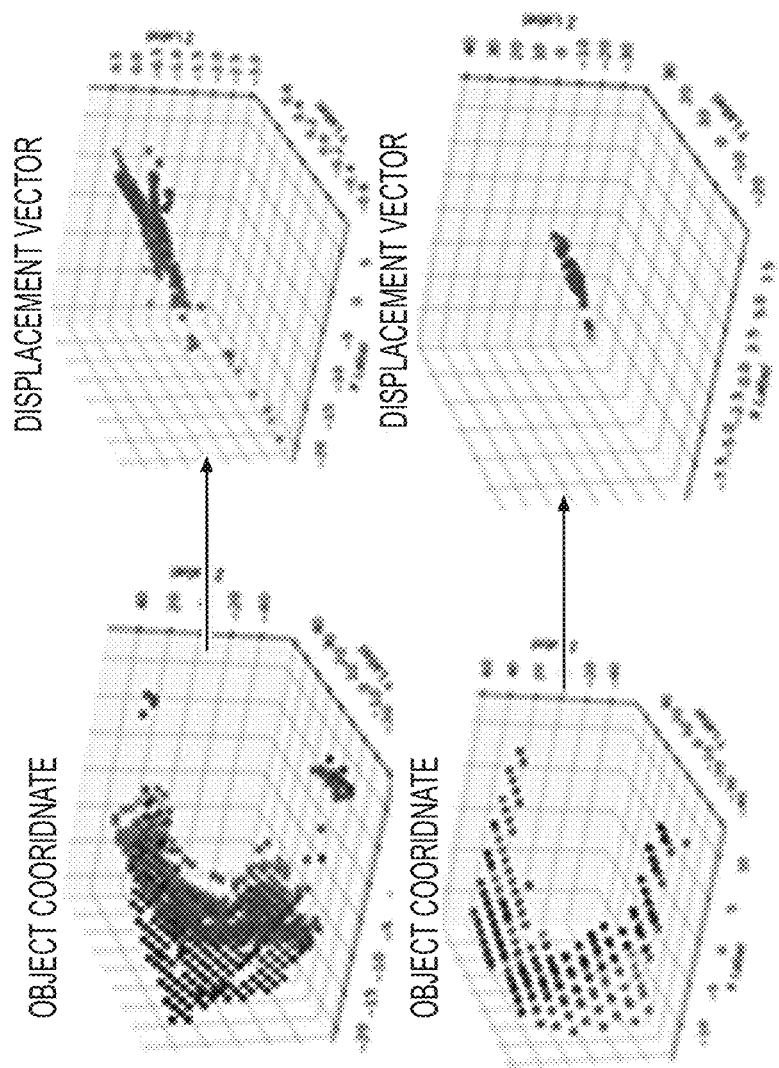

FIG. 6F shows the XYZ (in object frame of reference) of each perturbed view subtracted from the corresponding reference view to generate a feature vector. This may include overlapping points or reference 2D locations, and result in the calculation of a depth difference between the overlapping points in the first view and second view as described be step S406 in FIG. 4.

Referring again to FIG. 4, step S408 includes associating the perturbation between each of the second views and the first view with the respective calculated depth differences. Step S410 includes training an algorithm model to identify a pose of the target object corresponding to the 3D model based on the association of the perturbation.

FIGS. 7A-7C show a sample perturbation in more detail so as to further explain the generation of training data.

Given a training view 7) and its neighboring perturbed poses, $Tj_{per_i}$, the training data generation can be described as:

Input: $T_j, n_p$=number of perturbed samples, $Tj_{per_i}, i=1:n_p$ is the $i^{th}$ perturbed view corresponding to $j^{th}$ training views.

Output: $(f_{j_i}, l_{j_i})$

1. Generate a depth map from an object or a 3D model corresponding to $T_j$ and name it as $D_j$, as shown in FIG. 7A.
2. Uniformly sample the depth map, $D_j$ containing the object or the 3D model. FIG. 7A shows a rendered depth map with reference view 700 and perturbed view 701. FIG. 7A is of a sampled location (u,v), also referred to as a reference 2d location, corresponding to $T_j$.
3. Project (u, v) to camera coordinate $(x_c, y_c, z_c)$.
4. Project $(x_c, y_c, z_c)$ into object coordinate, $(x_o, y_o, z_o)=(x_c, y_c, z_c) \times T_j^{-1}$ as shown in FIG. 7B.
5. Store $V_j^{obj}=[x_j, y_j, z_j]=(x_o, y_o, z_o)$ for runtime use. The storage may be in a memory, parameters defining the trained algorithm model, and the non-transitory computer readable medium may further embody instructions to cause the one or more processors to perform such a storage at any point during the processes described herein.

For $i=1:n_p$:

Project $(x_o, y_o, z_o)$ into perturbed camera view $Tj_{per_i}$ as $(x_{per_i}, y_{per_i}, z_{per_i})=(x_o, y_o, z_o) \times Tj_{per_i}$, where $(x_{per_i}, y_{per_i}, z_{per_i})$ is also referred to a 3D-point set and is expressed in the camera coordinate system, project the $x_{per_i}, y_{per_i}, z_{per_i}$ into the $(u_{per_i}, v_{per_i})$ space using the camera intrinsic parameters, Compute the feature vector $f_{ji}=z_{per_i}-D_j(u_{per_i}, v_{per_i})$ an example of which is shown in FIG. 7C. This may correspond to a depth difference of the reference 2D location between in the first (reference) view and any, or every, one of the second (perturbed) views.

Compute the labels $l_{ji}=T_j^{-1} \times Tj_{per_i}$.

In view of the processes described above, the ensemble of decision trees trainer 140 may then be used to train an ensemble of trees. Given a set of training input and output pairs $(f_{j_i}, l_{j_i})$, trainer 140 may learn a mapping function $H(x,\theta)$ that can map any unknown input $(f_{unknown})$ to its corresponding label $l_{predict}$. The system will use an ensemble of weak mapping regressors $\{h_1(x,\theta_1), h_2(x,\theta_2), \ldots h_c(x,\theta_c)\}$ to form a strong regressor $H(x,\theta)$. The weak regressors included herein may be a decision tree, for example as shown by:

$$H(x,\theta)=a_1 h_1(x,\theta_1)+a_2 h_2(x,\theta_2)+ \ldots +a_c h_c(x,\theta_c)$$

In case of regression, the output is a continuous value, therefore for a node n, representing a region $R_n$ with $N_n$ samples, $L_2$ norm (mean square error) may be used as the e objective function to determine split nodes. The objective function for determining the split node of a weak classifier can be expressed as:

$$J = \frac{1}{N_n}\sum_{i=0}^{N_n}(l_{j_i} - E(l_{j_i}))^2$$

where, $$E(l_{j_i}) = \frac{1}{N_n}\sum_{i=0}^{N_n}(l_{j_i})$$

Figure 8:
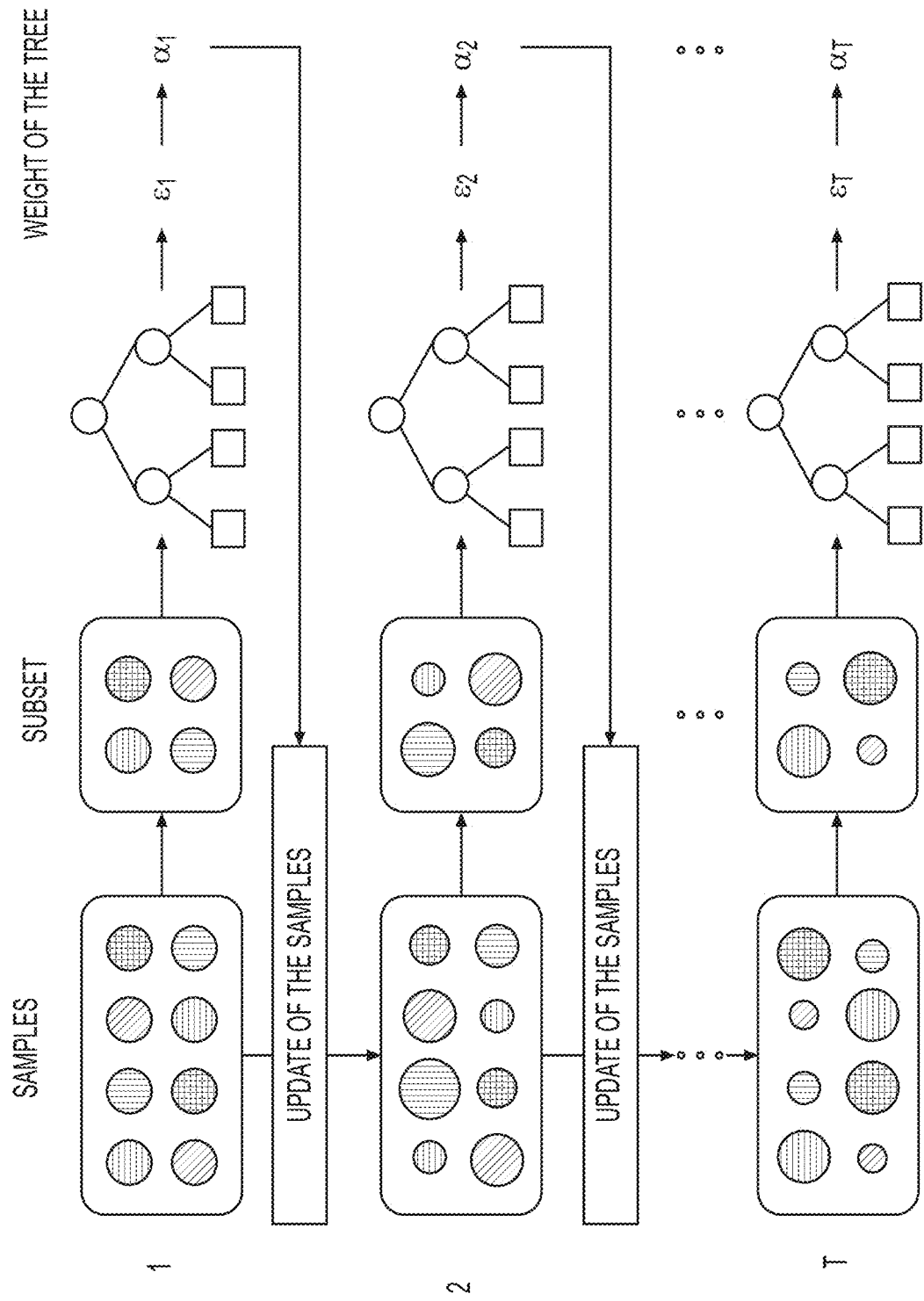
FIG. 8 is a diagram showing generation of a decision tree for pose learning according to the disclosure.

The trainer 140 may use a bagging (bootstrap aggregation) principle to select samples for each weak classifier. That is, given a standard training set D of size n, bagging generates m new training sets $D_i$, each of size n', by sampling from D uniformly and with replacement. Each decision tree regressor can be trained using a set of random samples drawn independently without replacement from the whole sample sets. The sample set of each weak classifier may follow same distributions. An exemplary pose learning decision tree is shown in FIG. 8. FIG. 8 shows a set (or ensemble) of trained decision trees based upon the principles described herein.

Refining Object Pose

Taking into consideration the ensemble of trained decision trees described above, an aspect of this disclosure is to refine an object pose using the ensemble of trained decision trees. The initial pose of the object may, for example, be iteratively refined using multiple trained views, and the system of FIGS. 1 and 2 may, using such aspects, be configured to select a best refined pose using residual error as a cost function.

Figure 9:
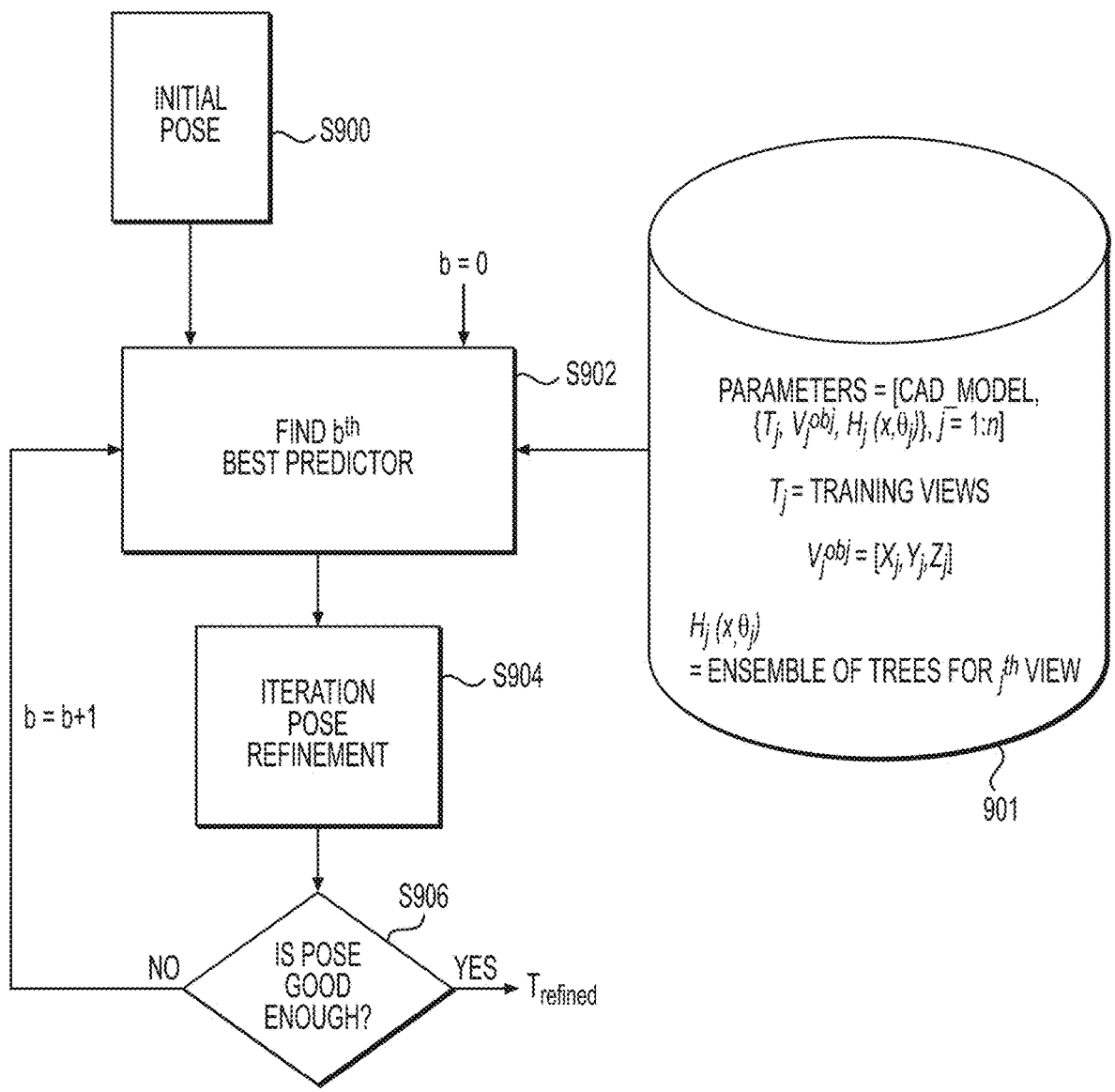
FIG. 9 is a flow diagram of iterative pose refinement according to the disclosure.

FIG. 9 shows a multi-view iterative pose refinement process according to some aspects. First, in step S900 an initial pose is compared with all of a stored model and a best predictor (e.g., $b^{th}$ best predictor) can be selected. That is, a pose predictor can predict a pose of an object at step iteration i, and give the pose at iteration i-1. Then, in step S902, the initial pose is refined iteratively using the parameters of the best model, parameters being shown in the parameter input box 901. For example, given the pose at iteration at i and i-1, an improvement factor can be computed. If the improvement factor is, for example, positive, the system at step S902 may increase i to i+1 and proceed back to step S900 if necessary.

In step S904, a residual error between the refined pose and a ground truth is computed. A ground truth can be determined, for example, based upon direct observation. Steps S900, S902 and S904 can be repeated for n best poses, and a best refined pose is ultimately selected during determination of acceptability of pose step S906. In some aspects, the best trained pose would be a post that is closer to the initial pose and may be determined using rotation error as the cost measure. Further refinement may occur for each trained view, and a view with the lowest residual error may ultimately selected in step S906.

Figure 10:
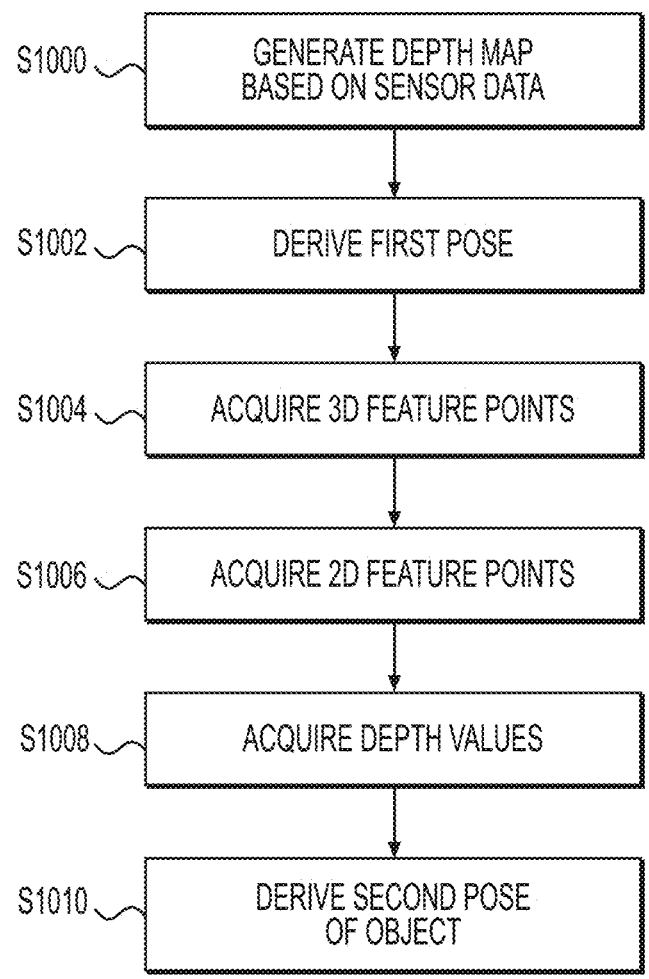
FIG. 10 is a flow diagram of an example method according to the disclosure.

FIG. 10 provides a further flow chart to describe the derivation of the best otherwise referred to as a second) pose. FIG. 10 shows a process than can be performed by the control device 40, or by any non-transitory computer readable medium having instructions to cause processors to perform such a method according to this aspect.

In step S1000, a depth map may be generated based on sensor data. The sensor data may be acquired, for example, by a depth sensor. The depth sensor may be provided within the imaging unit 21 in FIG. 1.

In step S1002, a first pose may be generated. The first pose may be a first pose of the target object, and may correspond to the depth map. This may be a "best guess" pose, that can be done using the sensor data and/or with any additional information received by the control device 40. This first, or initial pose, may be from within a range of, for example, (30 mm, 30°).

In step S1004, 3D feature points may be acquired based upon a 3D model that corresponds to the object. The 3D model may be any model, including a STL CAD model using a .stl file that contains geometry information.

In step S1006, the system may acquire 2D feature points by projecting the 3D feature points onto a virtual plane using the first, or initial, pose, and the camera intrinsic parameters of the virtual camera or a camera that captures the object.

In step S1008, the system may acquire depth values associated with 2D locations of the depth map. The 2D locations may be at the same positions as the 2D feature points on the virtual plane.

Then, in step S1010, a best, or second pose of the object may be derived. This can be done by applying a trained algorithm model to a difference between coordinate values of the 3D feature points and the respective depth values. In some aspects, the coordinate values of the 3D feature points are the Z coordinate values.

In some aspects, the trained algorithm model is the trained algorithm model developed as described in FIGS. 4-8 of this disclosure.

Further discussion of exemplary algorithms used by pose predictor to estimate the refined, second pose of the object given the initial, first pose and the ensemble of trained decision trees, and of the pose refinement algorithm is provided herein.

Pose Predictor Algorithm:
Let $D_o$, $(x_o, y_o, z_o)$, $T_{init}$, $T_j$ and $H_j(x,\theta)$ are the observed depth map, feature locations, initial pose, training pose and an ensemble of decision trees for an object.

Input: $D_o$, $(x_o, y_o, z_o)$, $T_{init}$, $T_j$ and $H_j(x,\theta)$
Output: ($T_{predict}$)
1. Project $(x_o, y_o, z_o)$ into initial pose $T_{init}$ as $(x_{init}, y_{init}, z_{init}) = (x_o, y_o, z_o) \times T_{init}$
2. project $(x_{init}, y_{init}, z_{init})$ into the $(u_{init}, v_{init})$ space
3. Compute the feature vector $x = z_{init} - D_o(u_{init}, v_{init})$
4. Predicted pose with respect to $T_j$ $\delta T = H_j(x,\theta)$
5. Predicted pose $T_{predict=T_j \times \delta T}$
Pose Refinement Algorithm
Input: $D_o$, $(x_o, y_o, z_o)$, $T_{init}$, $T_j$ and $H_j(x,\theta)$
Output: ($T_{predict}$)
$T_0 = T_{init}$
For i=0: max_num_of_ietartions-1:
 1. Predicted pose $T_{predict=Pose\ Predictor(\ )}$
 2. Compute improvement factor ($G_j$) between $T_i$ and $T_{predict}$
 3. If $G_i < 0$, Break.
Multi-view Pose Refinement Algorithm
In many situations, the initial pose is far from the ground truth. Thus, the closest pose to the initial pose may not be the closest post to the ground truth. Thus, n-closest pose may need to be chosen as the potential initial poses.
Input: $D_o$, $(x_o, y_o, z_o)$, $T_{init}$
Output: ($T_{refined}$)
$T_0 = T_{init}$
$T\_b$, b=1:n, n-closest pose to $T_{init}$
$E\_res = [\ ]$
For b=0:n:
 1. Predicted pose $T_{predict}^b$ =Iterative Pose Refinement ( )
 2. Compute residual error (e) using, $T_{predict}^b$
 3. $E\_res[i] = e$, $T_b[i] = T_{predict}^b$
Thus, a best refined pose using a minimum residual error may be determined.

Pyramid of Ensemble of Trees for Accurate Pose Estimation

Further aspects of this disclosure relating to a pyramid of ensemble of trees are as follows.

A pyramid of ensemble of trees may be developed to further improve accuracy of a pose estimation algorithm. The pyramid of ensemble of trees may include a plurality of layers of an ensemble of trees. The ensemble of trees may be the ensemble of trees described with respect to FIGS. 7 and 8.

An exemplary pyramid of ensemble of trees may comprise several layers, each layer provides a type of refinement for pose estimation. A top layer may provide, for example, a coarse refinement. A bottom layer may provide, for example, a fine refinement. The pyramid may comprise layers between the top and bottom layers which may provide, from higher to lower layers, progressively finer refinements.

At each layer, an initial pose of an object can be iteratively refined using multiple trained views, the trained views being views acquired, for example, by the method described with respect to FIG. 4. Ultimately, a best refined post can be advantageously chosen, and this may be done using residual error as the cost function.

For example, in some aspects, each layer is a refinement of candidate poses based on the depth difference for one of the overlapping points, or the reference 2D locations, described with reference to FIG. 4.

Figure 11:
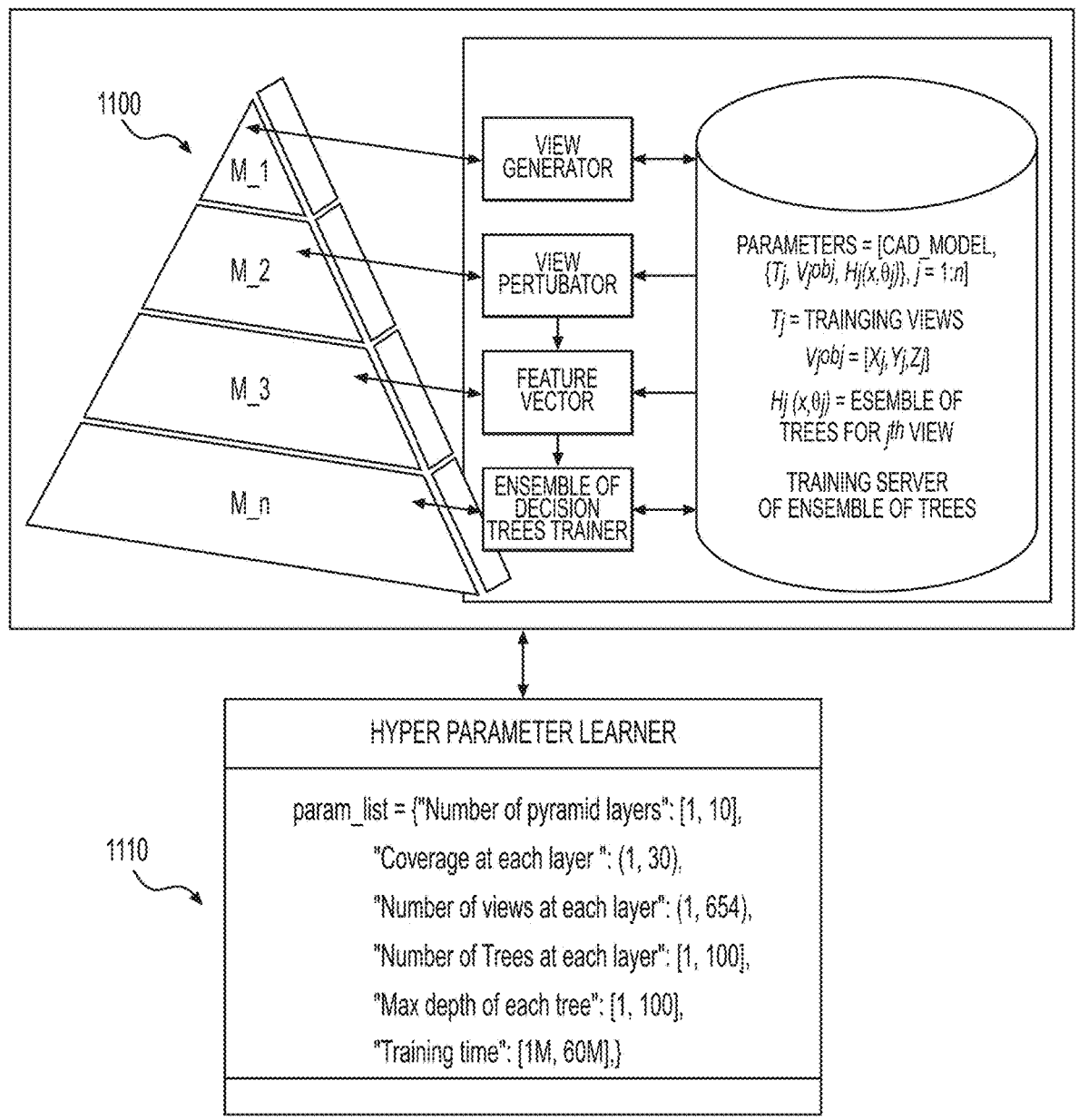
FIG. 11 is an example of a pyramid of ensemble of trees according to the disclosure.

FIG. 11 shows an exemplary pyramid of an ensemble of trees. While the exemplary pyramid shows 4 layers, the lowermost layer is designated as M n and thus the number of layers in the pyramid is not particularly limited. Each individual layer may use the training system of FIG. 3 (provided again with FIG. 11) to find its parameters.

In FIG. 11, the top layer M_1 is trained to refine poses coarsely, and the bottom layer M_n is trained to refine poses finely. The hyper parameter learner 1110 is provided to coordinate between layers of the pyramid to obtain optimal hyper parameters of the pyramid of ensemble of trees.

Accordingly, the pyramid of ensemble of trees of FIG. 11 has three components: a pyramidal architecture to refine the pose from coarse to fine, a hyper parameter learner to automatically determine a number of layers required in the pyramid and parameters for each layer, and a pyramidal predictor to refine the pose from a coarse label to a fine label using a pose confidence measure. Each component is further described herein.

Refine Pose from Coarse to Fine

A first aspect of the pyramid of ensemble of trees of FIG. 11 is to refine a pose from a coarse level to a fine level. The pyramidal architecture may use a concept of modularity to approximate a complex machine learning function. This may involve using a plurality of simpler machine learning functions. That is, instead of using a complex machine learning function to attempt to bring a pose from a coarse to a fine level, a set of simpler learning functions, each learning function bringing the pose from to progressively more fine levels (e.g., from coarse to intermediate, the intermediate to fine), may be provided.

Figure 12:
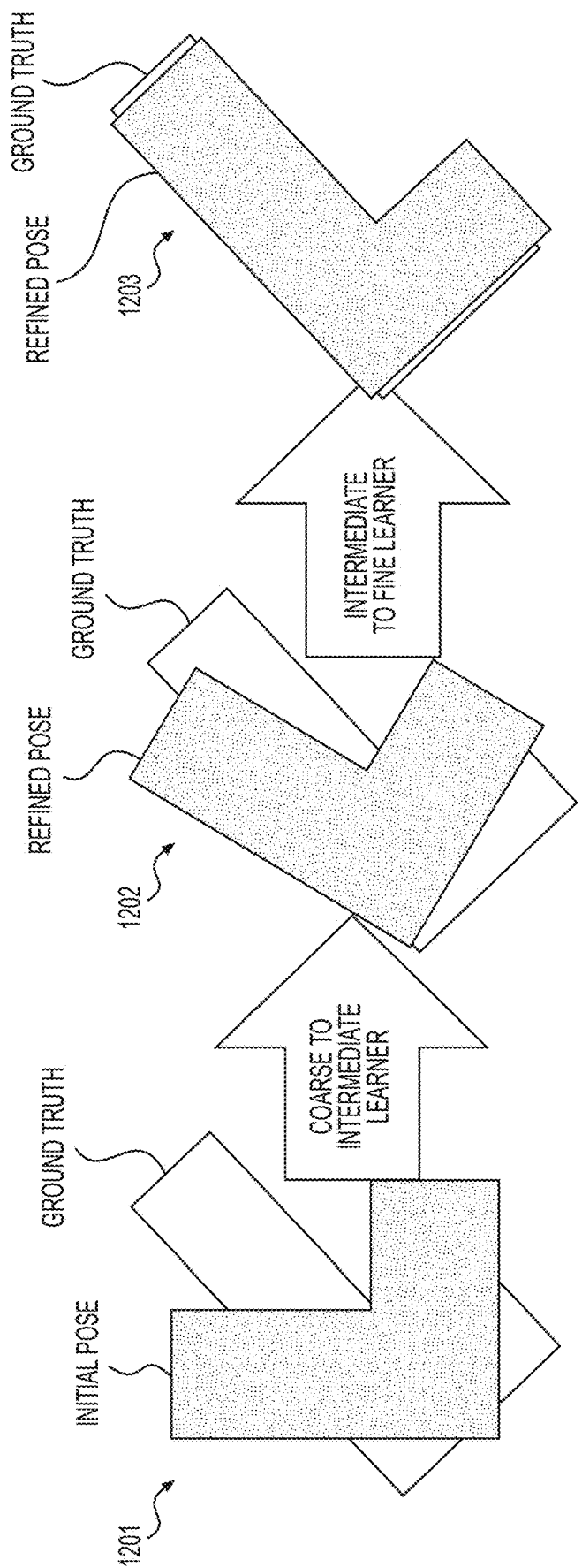
FIG. 12 is a diagram showing coarse to fine refinement according to the disclosure.

FIG. 12 shows a pyramidal architecture for a fine to a coarse refinement. In each position at FIG. 12, the darker shaded "L" is the pose, and the lighter shaded "L" is the ground truth. The ground truth stays consistent throughout the iterations given that a ground truth does not change. The pose, instead, will progressively change from an initial pose as in 1201, which will be significantly far from the ground truth. 1201 corresponds to a coarse label. The second learning function will result in a refined pose as in 1202, which is an intermediate label having a relative closeness to the ground truth, but still some error. The fine label in 1203, a third level of this exemplary pyramid of ensemble of trees, provides a refined pose that results in a pose that is very close to the ground truth (or the true pose).

Hyper Parameter Learner

The hyper parameter learner will construct a hyper-grid space of the hyper parameters involved in the pyramid of ensemble of trees. The hyper parameters to be used are, for example, any or all of a number of layers, a number of views at each layer, a neighboring size of each view, a number of trees, and a depth of each tree. The hyper parameter learner may use a random search algorithm to determine the optimal hyper parameters for any given pyramid of ensemble of trees.

Pyramidal Pose Predictor

The pyramidal pose predictor described herein may sequentially refine the pose instead of attempting to refine the pose in one iteration. In a first loop, individual models are trained to decrease the pose error to a set value. The next stage can pick up the refined poses and further refine the poses to a smaller error based upon a training algorithm. This may continue for all specified stages.

In the multi-view (or second) loop of the pyramidal pose predictor, multiple reference poses and their corresponding estimators can be considered for pose refinement. Multiple estimators may advantageously allow for a more accurate ultimately refined pose, given that an estimated pose, even one that most closely resembles the input pose, may be far from the ground truth. Thus, the best estimator (the one most closely resembling the ground truth) is not necessarily the one closest to the pose, but instead is one within the same area of a view sphere.

The multi-view loop may utilize a small subset of views, the small subset of views being a number of views (e.g., 1 to 5, 1 to 10, 1 to 100 or 1 to 500) that are closest to the current pose. The number of views to consider is a hyper parameter given to the algorithm. Then, once a refined pose is returned for each view, the refined pose with the lowest residual error is selected.

An inner refinement loop, or a third, most inner loop of the pyramidal pose predictor, may move the pose to what the model determines is the correct pose. The loop may evaluate the quality of the pose and continue until the quality stops improving. The inner refinement post will first calculate a feature vector of the current pose in the loop. The current pose will either be the first pose inputted into the loop or some subsequent version of its attempted refinement. Then, the feature vector can be used by inputting the feature vector into the reference pose estimator. The loop will output a pose error.

Figure 13:
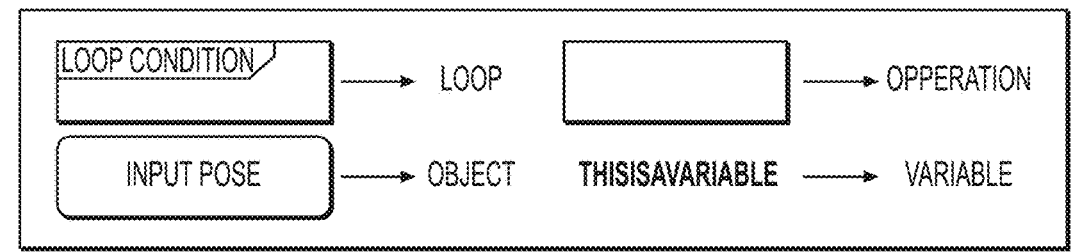
FIG. 13 is a flow diagram showing an overview of the process of utilizing a pyramid of ensemble of trees according to the disclosure.
Figure 13:
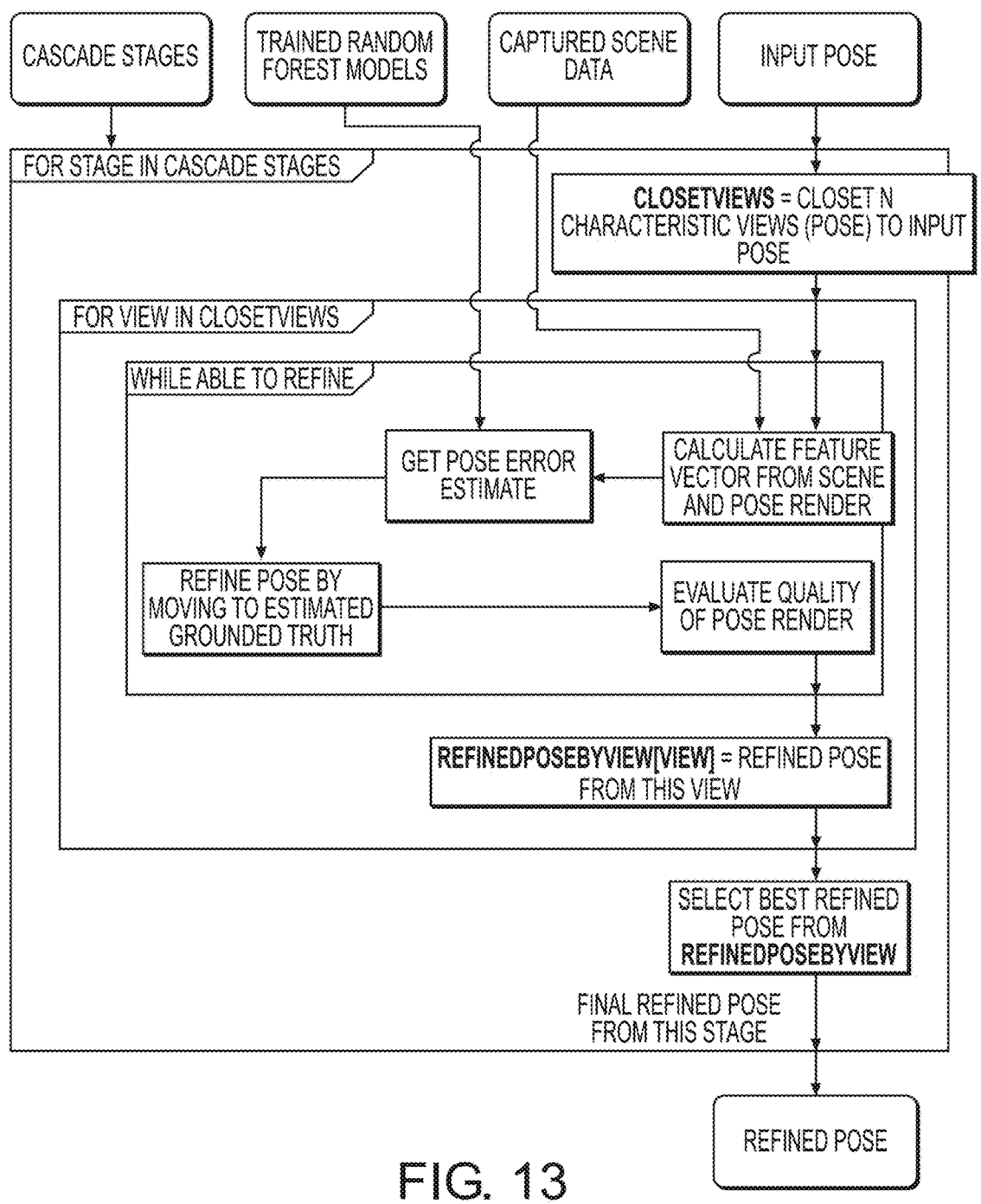

Using the pose error, the inner refinement loop constructs a transformation matrix from the current pose to a candidate refined pose. Multiplying the current pose by the update transformation matrix yields a refined pose candidate. The candidate's residual error is calculated and compared to the current pose's residual error. If the error decreases, this loop will accept the refinement and continue refining, making this refined pose candidate the new current candidate. Once the error can no longer be decreased, the refined pose and its error are added to a container of the best refinements for each view. Ultimately, as shown in FIG. 13, a best refined pose is selected.

Although the control device 40 is illustrated in FIG. 1 as a separate element from robots 1 to 3, the control device 40 can be a component of any combination of robots 1 to 3, or distributed among any combination of the robots 1 to 3.

Although the optical system 20 is described above as being distributed as elements of robots 1 and 2, the optical system 20 can entirely be on a single robot or device. In an alternative embodiment, the optical system 20 can include an imaging unit 21, without an illumination unit 22.

Although the forgoing description of the method and computer readable medium for pose estimation is in the context of a control device, robot, and robot system, of the method and computer readable medium for pose estimation are described as implemented using an exemplary control device, robot, and robot system, the method and computer readable medium for pose estimation can be implemented in alternative computing environments including a processor, memory, and an imaging device having an RGB-D image sensor. For example, alternative embodiments are, by non-limiting example, a head mounted display, or a personal computer with an imaging device.

As discussed above, the above-mentioned exemplary embodiments of the method and computer readable medium for pose estimation are not limited to the examples and descriptions herein, and may include additional features and modifications as would be within the ordinary skill of a skilled artisan in the art. For example, the alternative or additional aspects of the exemplary embodiments may be combined as well. The foregoing disclosure of the exemplary embodiments has been provided for the purposes of illustration and description. This disclosure is not intended to be exhaustive or to be limited to the precise forms described above. Obviously, many modifications and variations will be apparent to artisans skilled in the art. The embodiments were chosen and described in order to best explain principles and practical applications, thereby enabling others skilled in the art to understand this disclosure for various embodiments and with the various modifications as are suited to the particular use contemplated.

What is claimed is:

1. A non-transitory computer readable medium that embodies instructions that cause one or more processors to perform a method for training an object detection algorithm, the method comprising:
   (a) specifying a first view of a 3D model with respect to a virtual camera;
   (b) generating a depth map by projecting the 3D model based on the first view;
   (c) generating a second view around the first view by perturbing the first view;
   (d) selecting reference 2D locations from the first depth map, the reference 2D locations being in an overlapping area of the 3D model between the first view and the second view;
   (e) transforming the reference 2D locations into a 3D-point set corresponding to the second view;
   (f) for each reference 2D location, calculating a depth difference between the first view and the second view at the reference 2D location using (i) the 3D-point set and (ii) the depth map;
   (g) associating the perturbation between the second view and the first view with the calculated depth differences; and
   (h) training an algorithm model using, as an input to the algorithm, the perturbation and the depth difference associated with each other, to identify a pose of an object corresponding to the 3D model.

2. The non-transitory computer readable medium according to claim 1, wherein the second view includes a plurality of training views and a plurality of validation views.

3. The non-transitory computer readable medium according to claim 2, wherein the method further includes measuring a performance of the algorithm model using the plurality of validation views.

4. The non-transitory computer readable medium according to claim 3,
   wherein the perturbing of step (c) includes perturbing the first view by a first amount, and the method further includes determining a validation error for each of the plurality of validation views,
   wherein when the validation error is greater than a predetermined threshold, repeating step (c) using a second perturbation amount.

5. The non-transitory computer readable medium according to claim 3,
   wherein the perturbing of step (c) includes perturbing the first view by a first amount, and the method further includes determining a validation error for each of the plurality of validation views,
   wherein when the validation error is less than or equal to a predetermined threshold, the method further includes (c1) marking all of the second views as visited poses and labeling the second views as neighboring poses of the first view.

6. The non-transitory computer readable medium according to claim 2, wherein the training views are split into six degrees of freedom (DOF), and six random numbers are generated, a different one of the six random numbers corresponding to each of the degrees of freedom.

7. The non-transitory computer readable medium according to claim 1, wherein the training the algorithm model of step (h) includes (h1) learning a mapping function by using use an ensemble of weak mapping regressors.

8. The non-transitory computer readable medium according to claim 7, wherein the ensemble of weak mapping regressors are a decision tree.

9. The non-transitory computer readable medium according to claim 7, wherein the ensemble of weak mapping regressors are determined using a bootstrap aggregation principle.

10. A non-transitory computer readable medium that embodies instructions that cause one or more processors to perform a method for deriving a pose of an object, the method comprising:
    (a) generating a depth map based on sensor data acquired by a depth sensor sensing an object;
    (b) deriving a first pose of the object corresponding to the depth map;
    (c) acquiring 3D feature points based on a 3D model corresponding to the object;
    (d) acquiring 2D feature points by projecting the 3D feature points onto a virtual plane using the first pose;
    (e) acquiring depth values from the depth math, the depth values associated with 2D locations of the depth map, the locations being at the same locations as the 2D feature points on the virtual plane; and
    (f) deriving a second pose of the object by applying a trained algorithm model using, as an input to the trained algorithm, a difference between (i) Z coordinate values of the 3D feature points and (ii) the respective depth values.

11. The non-transitory computer readable medium according to claim 10, wherein the trained algorithm model is a model is generated by performing:
    (f1) specifying a first view of a 3D model with respect to a virtual camera;
    (f2) generating a depth map by projecting the 3D model based on the first view;
    (f3) generating a second view around the first view by perturbing the first view;
    (f4) selecting reference 2D locations from the first depth map, the reference 2D locations being in an overlapping area of the 3D model between the first view and the second view;
    (f5) transforming the reference 2D locations into a 3D-point set corresponding to the second view;
    (f6) for each reference 2D location, calculating a depth difference between the first view and the second view at the reference 2D location using (i) the 3D-point set and (ii) the depth map;
    (f7) associating the perturbation between the second view and the first view with the calculated depth differences; and
    (f8) training an algorithm model to identify a pose of an object corresponding to the 3D model based on the association of the perturbation; and
    (f9) identifying the second pose of an object corresponding to the 3D model based on the association of the perturbation.

12. The non-transitory computer readable medium according to claim 11, wherein the applying the trained algorithm model of step (f) includes learning a mapping function by using use an ensemble of weak mapping regressors.

13. The non-transitory computer readable medium according to claim 12, wherein the ensemble of weak mapping regressors are a decision tree.

14. The non-transitory computer readable medium according to claim 13, wherein the decision tree is a pyramid of ensemble of trees comprising a plurality of layers.

15. The non-transitory computer readable medium according to claim 14, wherein the plurality of layers include a topmost layer performing a most coarse refinement of the first pose, and a lowermost layer performing a most fine refinement of the first pose, and the second pose is determined upon performance of the most fine refinement.

16. The non-transitory computer readable medium according to claim 15, wherein the plurality of layers provides for sequential, progressively finer refinement during each of the plurality of layers until the refined first pose with a lowest residual error is reached.

17. The non-transitory computer readable medium according to claim 16, wherein the pose with the lowest residual error is added to a container of best refinements.

18. The non-transitory computer readable medium according to claim 14, wherein the pyramid of ensemble of trees utilizes a hyper parameter learner to determine a number of layers of the pyramid.

19. The non-transitory computer readable medium according to claim 13, wherein each layer is a refinement of candidate poses based on the depth difference for one of the overlapping points.

* * * * *